US011249952B1

(12) United States Patent
Andrews

(10) Patent No.: US 11,249,952 B1
(45) Date of Patent: Feb. 15, 2022

(54) DISTRIBUTED STORAGE OF DATA IDENTIFIERS

(71) Applicant: Amazon Technologies, Inc., Seattle, WA (US)

(72) Inventor: Thomas James Andrews, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 643 days.

(21) Appl. No.: 16/138,522

(22) Filed: Sep. 21, 2018

(51) Int. Cl.
| | |
|---|---|
| *G06F 16/00* | (2019.01) |
| *G06F 16/17* | (2019.01) |
| *G06F 9/54* | (2006.01) |
| *G06F 16/13* | (2019.01) |
| *G06F 16/182* | (2019.01) |
| *G06F 16/28* | (2019.01) |
| *G06F 16/16* | (2019.01) |
| *G06F 16/185* | (2019.01) |
| *G06F 16/58* | (2019.01) |
| *G06F 16/51* | (2019.01) |

(52) U.S. Cl.
CPC .......... *G06F 16/1734* (2019.01); *G06F 9/542* (2013.01); *G06F 16/13* (2019.01); *G06F 16/16* (2019.01); *G06F 16/182* (2019.01); *G06F 16/185* (2019.01); *G06F 16/285* (2019.01); *G06F 16/51* (2019.01); *G06F 16/5866* (2019.01)

(58) Field of Classification Search
CPC ...... G06F 16/16; G06F 16/185; G06F 16/285; G06F 16/051; G06F 16/5866; G06F 9/542; G06F 16/13; G06F 16/182; G06F 16/1743

USPC .......................................................... 707/821
See application file for complete search history.

(56) References Cited

U.S. PATENT DOCUMENTS

| | | | | |
|---|---|---|---|---|
| 7,945,600 B1* | 5/2011 | Thomas | ................ | G06F 16/353 707/804 |
| 8,285,760 B1* | 10/2012 | Sina | ........................ | G06F 16/51 707/824 |
| 10,761,813 B1* | 9/2020 | Echeverria | ............ | G06F 16/951 |
| 2014/0067469 A1* | 3/2014 | Bosworth | .......... | G06Q 30/0202 705/7.31 |
| 2014/0317186 A1* | 10/2014 | Niemi | .................... | H04L 65/403 709/204 |

* cited by examiner

*Primary Examiner* — Vincent F Boccio
(74) *Attorney, Agent, or Firm* — Lee & Hayes, P.C.

(57) ABSTRACT

This disclosure describes techniques implemented partly by a service provider network for distributed storage of event data in data storage according to a data-storage schema in order to reduce the amount of computing resources required to store and access the event data. The techniques may include generating event identifiers (IDs) for actions performed by users to manage cloud-based services. Rather than indexing event IDs by writing the event IDs to a database, the techniques described herein include storing event IDs in different file folders in storage according to a storage schema where the different file folders are assigned to store event IDs having different prefix portions. In this way, event IDs may be stored, or grouped, in different file folders according to prefix portions of the event IDs to reduce the amount of reads and writes required for the event IDs.

20 Claims, 12 Drawing Sheets

DISTRIBUTED STORAGE OF DATA IDENTIFIERS

BACKGROUND

Service provider networks offer network-based services to fulfill users' computing-service needs without the users having to invest in and maintain computing infrastructure required to implement the services. These service provider networks may provide many different types of services to users, such as on-demand computing services, managed-database services, software-execution services, and message queuing services. The service provider networks may allow users to manage the resources provided by these services via their user accounts, such as by submitting commands to perform actions such as creating a resource, deleting a resource, modifying a resource, and/or utilizing a resource. In some instances, an organization may have many users with user accounts that allow the users to perform actions to manage network-based services of the organization, and many actions may be taken by the various users. In such examples, the users may wish to know what actions were taken by users to manage their services, and by which of the authorized users. Accordingly, service provider networks may further provide an event-history service that logs, monitors, and retains account activity related to actions, or "events," performed for users' network-based services.

Users' may submit requests to the event-history service to view metadata for the events that have occurred with their services, such as indications of user accounts that performed actions, and indications of what types of actions were performed. The users may provide the event-history service with an event identifier (ID) that the event-history service uses to locate the event metadata representing the event, and provide the event metadata to the user per their request. Due to the large number of users, and large number of actions performed by the users to manage their services, the event-history service may monitor large numbers of events, and in turn store large amounts of event IDs. However, storing and looking-up large numbers of events requires large amounts of computing resources, such as memory and processing power.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
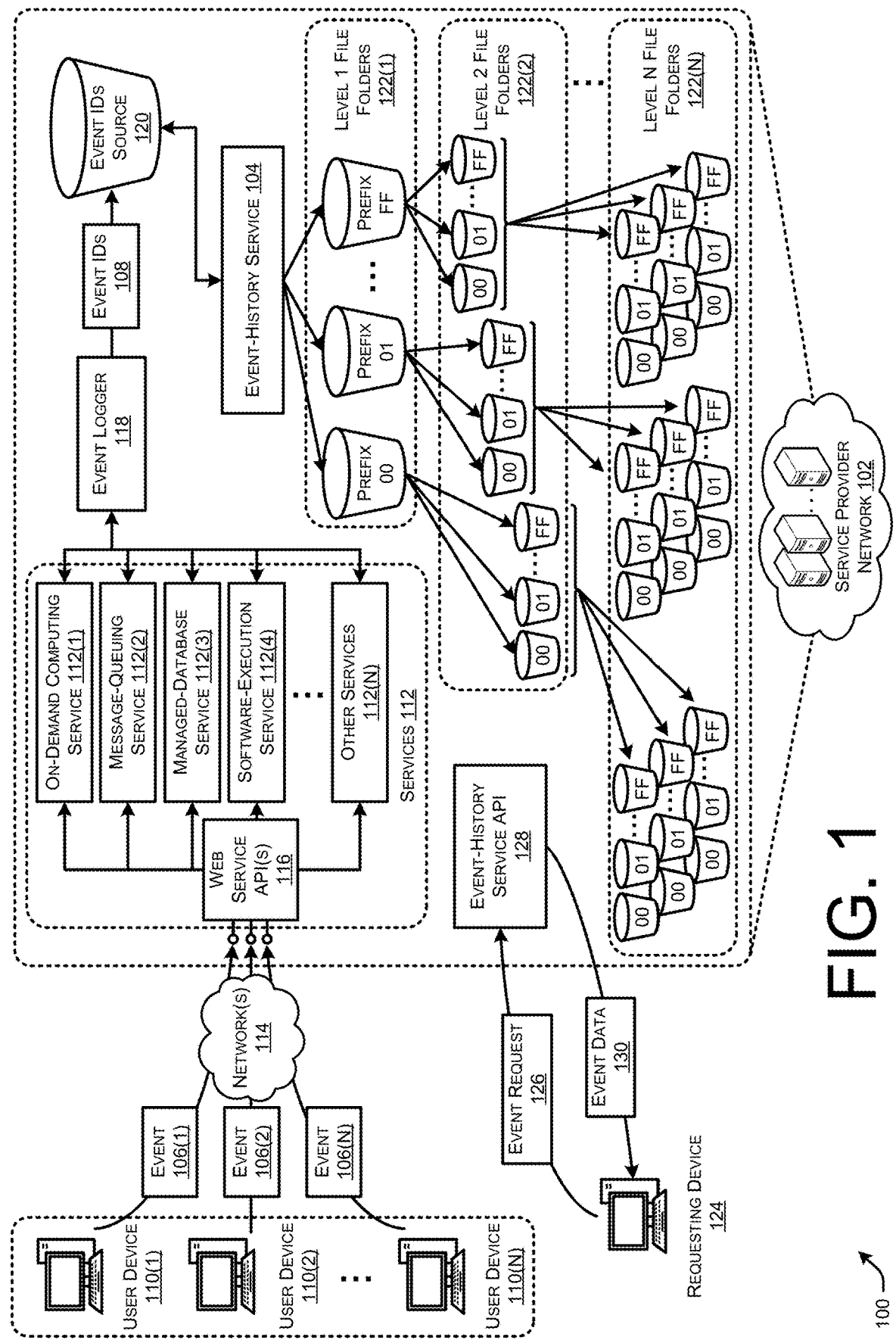
FIG. 1 illustrates a system-architecture diagram of an example environment in which a service provider network writes event identifiers (IDs) to storage according to a storage schema, and reads event IDs from storage to retrieve event metadata for a user request.

This disclosure describes, at least in part, techniques for distributed storage of event data in data storage according to a data-storage schema in order to reduce the amount of computing resources required to store and access the event data. The techniques described herein may include generating event identifiers (IDs) for actions performed by users to manage services that are provided for their use by a service provider network. The users often desire to view these events for various reasons, such as compliance, auditing, etc., and may submit requests to an event-history service of the service provider network for event metadata for the events. The event-history service may store the event IDs in a database to be used to identify the corresponding event metadata, such as a key in a key-value pair where the metadata is the value, and provide the event metadata to the users. However, storing large amounts of event IDs in the database in a serial fashion may result in large amounts of processing power to write the event IDs to the database for storage, and to read the read the IDs from the database to identify event IDs and corresponding event metadata to respond to users' requests. Rather than writing the event IDs to a database in a serial fashion, the techniques described herein include storing event IDs in different file folders in storage according to a data-storage schema, such as an N-ary tree, where the different file folders are assigned names that correspond to different prefix portions of the event IDs. In this way, event IDs may be stored, or grouped, in different file folders according to prefix portions of the event IDs to reduce the amount of reads and writes required for the event IDs.

Service provider networks offer various network-based services to fulfill users' computing-service needs without the users having to invest in and maintain computing infrastructure required to implement the services, such as on-demand computing services, managed-database services, software-execution services, and message queuing services. The service provider networks may allow users to perform actions to manage their services. As a specific example, a user of an on-demand computing service may be allowed to perform actions to manage their on-demand computing service, such as adding a computing resource, removing a computing resource, and/or modifying a computing resource. The users may desire to have event metadata for each of these actions, or events, for various reasons such as governance, operational auditing, and risk auditing of their services. Accordingly, service provider networks may provide an event-history service that can log, continuously monitor, and retain user account activity related to actions or events across the network-based service infrastructure for user accounts. The event-history service can interface with the services to identify and log the event metadata in a database using respective event IDs, and to later identify the event metadata to provide responsive to user requests by querying against the event ID. In some examples, the event-history service may index the event IDs in the database one-by-one as the events occur to create a list of event IDs. However, performing reads on the database to identify a specific event ID to service user request may require large amounts of processing power, memory, and time.

The techniques described herein may reduce the amount of processing power and latency associated with the event-history service writing event IDs to storage, and reading the event IDs from storage. For example, rather than simply storing or indexing the event IDs as a list in a database, the event-history service may generate file folders that distribute the storage of the event IDs according to a storage schema to reduce the number of writes of event IDs, and the number of reads of event IDs. As a specific example, the event IDs may be generated according to a predefined nomenclature that includes a prefix for assigning the event IDs to one of the file folders, and a suffix (e.g., UUID) that is used to identify the event metadata. In some examples, the prefix may include one or more bits or numbers that can be used to sort the event IDs into file folders. For example, the event IDs may be generated to include respective prefixes that are defined according to hexadecimal, such as "00," "01," through "FF" to split the event IDs into groupings of 256. In such examples, the event-history service may generate and store 256 file folders that may each be assigned to (or named for) a respective prefix of the event IDs such that event IDs are stored, indexed, or written to the file folder that corresponds to their prefix.

Thus, the event-history service may ingest event IDs by writing the event IDs to respective file folders based on the prefixes of the event IDs and the names of the file folders. In some examples, the event-history service may simply write each event ID to a file folder as the events occur and the event IDs are generated and retrieved by the event-history service from one or more buffers. However, to limit or reduce the number of writes for indexing event IDs, the event-history service may instead wait for a period of time to identify batches, or chunks, of event IDs stored in the buffers, sort the event IDs according to their prefixes, and write batches of event IDs to the appropriate file folders based on the prefixes for the event IDs in each batch. In this way, larger batches of event IDs may be written to the file folders to reduce the number of writes required for indexing the event IDs than if each event ID were written individually.

As noted above, grouping or indexing event IDs into file folders based on prefixes limits the amount of processing power and latency associated with reading the files to identify a specific event ID. For instance, rather than reading from a database in which all of the event IDs are indexed, the event-history service may determine which file folder to read from based on the portion of an event ID for which a user requests event metadata, and read from the appropriate file folder that stores event IDs with that prefix. However, as the number of event IDs maintained by the event-history service continues to grow, the processing power required to read from the individual file folders that store event IDs according to their prefix may increase.

Accordingly, the event-history service may define thresholds of event IDs that the file folders may store, and if the file folders reach those thresholds, the event-history service may further generate a second level of file folders to split the storage of the event IDs according to their prefixes even further. Rather than having event IDs with prefixes of only two bits (e.g., "00," "00," through "FF" in hexadecimal), the prefixes for the event IDs may include additional bits that are used to further assign the event IDs into the second level of folders. For instance, to assign event IDs to a second level of file folders, the event IDs may have prefix portions in hexadecimal that have four bits rather than two bits. As a specific example, if the first-level file folder that stores event IDs with a prefix of "00" reaches the threshold of event IDs that the file folder is configured to store, the event-history service may generate a second level of file folders into which the event IDs with "00" are stored based on a four-bit prefix portion. For example, the prefix portions of the event IDs that were assigned to the file folder of "00" may include four-bit prefix portions, such as "00-00," "00-01", through "00-FF." Accordingly, the second level of file folders may also include 256 file folders that index or store event IDs according to a second portion of the prefixes of the event IDs. In this way, as the first level file folders reach the threshold limit of event IDs that they are allowed or configured to store, the event IDs stored in each of the first-level file folders may be split into 256 second-level file folders.

In this way, the event-history service may create a data-storage structure, such as an N-ary tree, to index or store event IDs in such a way that reading the file folders to identify a specific event ID requires less reads. For instance, if a user requests that the event-history service provide event metadata for an event ID with a prefix portion of "00-01," the event-history service need only read the second-level file folder that stores the event IDs with a prefix of "00-01," and also the first-level file folder that stores event IDs with a prefix of "00." In this way, the event IDs may be grouped or indexed into a cascading structure of file folders according to the prefix of the ID.

The techniques described herein may improve upon prior art techniques by reducing the amount of processing power and latency for writing event IDs to storage, and reading event IDs from storage to identify a specific event ID. For instance, the event-history service may sort event IDs while they are stored in buffers based on their prefixes, and write batches of the event IDs to the file folders that correspond to the prefixes for the event IDs. This reduces the number of writes requires to store or write the event IDs to storage in the file folders. Additionally, the grouping, storing, or indexing the event IDs in disparate file folders according to the prefixes, the amount of event IDs that must be read is reduced when the event-history service is attempting to locate a specific event ID. Rather than having to read from a file folder that stores all of the event IDs for a user account, the event-history service may only search one, or a smaller group, of file folders that store event IDs according to their prefixes and store smaller grouping of event IDs. In this way, the amount of reads that are performed to identify a specific event ID is reduced.

While the techniques are described herein with reference to storing event IDs, any type of data or identifiers may be stored according to the techniques described herein to reduce the number of reads/writes required for managing the data or identifiers. Further, while some of the techniques are described as utilizing an N-ary tree structure, any type of cascading data structure (or file structure), relational data structure, or any other data structure can be utilized to perform the techniques described herein. Further, while the prefix portion and suffix portion of the event IDs are described according to particular numbers, syntax, nomenclature, etc., any type of nomenclature or identification system may be utilized to identify the event IDs according the techniques described herein. Moreover, any portion of the event IDs other than the prefix may be utilized to identify and organize the event IDs according to the techniques described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 provides an event-history service 104 that logs events 106 by writing event identifiers (IDs) 108 to storage according to a storage schema, and reading event IDs 108 from storage to retrieve event metadata for a user request.

In some examples, the service provider network 102 may comprise clusters of managed servers stored in data centers located across geographic areas. The service provider network 102 may be a distributed network through which users (often customers) may interact via user devices 110 to manage or otherwise interact with service 112 provided by the service provider network 102. the users may comprise one or more of individual users, groups of users, organizations, businesses, or other entities that interact with the service provider network 102 via respective user devices 110(1), 110(2), through 110(N) (collectively referred to as "user devices 108"). The user devices 110 may be any type of computing device capable of connecting to the service provider network 102 via a suitable data communications network 114 such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

The service provider network 102 may be managed by a service provider, and may provide various types of services 112, such as an on-demand computing service 112(1), a message-queuing service 112(2), a managed-database service 112(3), a software-execution service 112(4), and/or other services 112(N). The on-demand computing service 112(1) may be a collection of computing resources configured to instantiate VM instances and to provide other types of computing resources on demand. For example, a customer or other user of the service provider network 102 may interact with the on-demand computing service (via appropriately configured and authenticated API calls) to provision and operate VM instances that are instantiated on physical computing devices hosted and operated by the service provider network 102. The VM instances may be used for various purposes, such as to operate as servers supporting a web site, to operate business applications or, generally, to serve as computing resources for the customer. Other applications for the VM instances may be to support database applications, electronic commerce applications, business applications and/or other applications. The message-queuing service 112(2) maybe a managed message queuing service that enables users to send, store, and receive messages between software components at any volume without losing messages or requiring that other services 112 be available. The message-queuing service 112(2) may include different types of message queues to users. The managed-database service 112(3) may comprise a nonrelational database that delivers reliable performance at any scale and is fully managed, multi-region, multi-master database that provides consistent low latency, and offers built-in security, backup and restore, and in-memory caching. The managed-database service 112(3) may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. The software-execution service 112(4) may provide users with a serverless compute service that runs code in response to triggers and manages the underlying compute resources for users. Users can utilize the software-execution service 112(4) to extend other services 112(N) with custom logic, or back-end services that operate at service provider network 102 scale, performance, and security.

The service provider operating the service provider network 102 may charge a fee for utilization of the resources to a user that creates and uses the services 112. The fee charged for a particular computing service 112 might be based upon the type and/or configuration of the underlying computing resources. For example, in the case of a data processing computing resource, like a VM instance, the fee for use of the service 112 might be charged based upon the amount of time the underlying computing resource is utilized. In the case of a data storage computing resource, the fee might be computed based upon the amount of data stored and/or the amount of data transferred into or out of the computing resource. The fees for other types of resources might also be based upon other considerations. A service provider might also utilize various purchasing models to determine the amount to charge a user for use of resources provided by the service provider network 102.

The services 112 described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The resources described briefly above might also be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

As illustrated, the users may utilize their user devices 110 to interact with the service provider network 102 to perform actions, or events 106. For example, one or more of the services 112 may include and expose a web service application programming interface (API) 116 to receive the events 106 (such as requests) that include data identifying the actions or commands to manage or utilize the services 112. The events 106 may be called by other components, such as through a command line interface ("CLI") operating within the service provider network 102, and/or a software development kit (SDK). The services 112 may perform the actions/commands of the events 106 as requested. In some examples, the users may log in to a user account using credentials provided by the service provider network 102 in order to submit the events 106 via their user device 110. In this way, each event 106 may be associated with a particular user account that performed the underlying event or action.

The event-history service 104 may include, or be associated, with an event library and/or an event logger 118. Generally, the event logger 118 may be integrated with the services 112 such that the event logger 118 is able to identify the events 106 (e.g., using API calls to the web service API(s) 116) from the front-end hosts of the services 112. As the event logger 118 identifies the events 106, the event logger 118 may batch up chunks of the API calls (or events IDs 108) and send them to an event ID source 120. The event ID source 120 may comprise a file, or a file folder, that is stored in a cloud-based storage resource that may be available via a cloud-based storage service 112 provided by the service provider network 102. In various examples, the event logger 118, or another component not illustrated, may create the event IDs for each of the events 106. The event IDs may be defined according to any scheme or nomenclature, such as a nomenclature that includes prefixes for storing the event IDs, and suffixes for identify related event metadata. The prefixes may comprise any type of textual identifier, such as identifiers including one or more bits (e.g., binary, hexadecimal, etc.). For instance, the prefixes may be defined according to hexadecimal, such as "00," "01," through "FF" to split the event IDs into groupings of 256. In further examples, the prefixes may have additional portions, such as a four-bit prefix portion with two more bits of hexadecimal, such as "00-00," "00-01", through "00-FF." Generally, the suffixes may comprise any type of ID, such as universal uniform identifiers (UUIDs) which are randomly or semi-randomly generated such that the event IDs 108 will not collide. However, the event IDs 108 may include suffixes that include any type of identifier.

The event-history service 104 may then obtain the event IDs 108 from the event IDs source 120 and begin storing, or writing, the event IDs 108 in one or more file folders. In some examples, the event-history service 104 may sort the event IDs according to the user account that performed the corresponding event 106. Further, in some examples, the event-history service 104 may sort the event IDs 108 in a list based on the prefixes. For instance, event IDs 108 with a prefix of "01" may be sorted or positioned in the list before event IDs 108 with a prefix of "02," and so forth.

The event-history service 104 may then store, or write, the event IDs to one or more file folders 122. For example, the event-history service 104 may begin writing the event IDs to one or more level 1 file folders 122(1) that are assigned, or named, to store event IDs 108 based on the prefixes of the event IDs 108. As noted above, the prefixes of the event IDs may span from "00" to "FF" in hexadecimal such that 256 different prefixes are possible. Thus, the level 1 file folders 122(1) may include 256 corresponding file folders 122 to store event IDs 108 with the corresponding prefix portion. In this way, the event-history service 104 may write individual event IDs, or sorted "bunches," "chunks," or "groups" of event IDs 108 with matching prefix portions to the appropriate level 1 file folders 122(1). Thus, rather than storing or writing all of the event IDs 108 in a single file folder 122, the event-history service 104 may split up the event IDs 108 in various level 1 file folders 122(1), which results in more efficient reading to identify a particular event ID 108 (e.g., reduces the number of reads). Rather than searching a single file folder 122 with all the event IDs for a specific event ID 108, the event-history service 104 need only search the file folder 122 that stores event IDs 108 with a specific event ID 108 prefix.

Thus, grouping or indexing event IDs 108 into file folders 122 based on prefixes may limit the amount of processing power and latency associated with reading the file folders 122 to identify a specific event ID 108. However, as the number of event IDs 108 maintained by the event-history service 104 continues to grow for user accounts, the processing power required to read from the individual file folders that store event IDs according to their prefix may increase. Accordingly, the event-history service 104 may define thresholds of event IDs 108 that the file folders 122 may store, and if the file folders 122 reach those thresholds, the event-history service 104 may further generate a second level of file folders 122(2) to split the storage of the event IDs 108 according to their prefixes even further. For example, rather than having event IDs 108 with prefixes of only two bits (e.g., "00," "00," through "FF" in hexadecimal), the prefixes for the event IDs 108 may include additional bits that are used to further assign the event IDs 108 into the level 2 file folders 122(2). For instance, to assign event IDs 108 to the level 2 of file folders 122(2), the event IDs 108 may have prefix portions in hexadecimal that have four bits rather than two bits. As a specific example, if the level 1 file folder 122(1) that stores event IDs with a prefix of "00" reaches the threshold of event IDs 108 that the file folder 122 is configured to store (e.g., 10,000 IDs, 100,000 IDs, etc.), the event-history service 104 may generate or write level 2 file folders 122(2) that depend from at least the "00" level 1 file folder 122(1) into which the event IDs with "00" are stored based on a four-bit prefix portion. For example, the prefix portions of the event IDs 108 that were assigned to the file folder 122(1) of "00" may include four-bit prefix portions, such as "00-00," "00-01", through "00-FF." Accordingly, the level 2 file folders 122(2) for that particular level 1 file folder 122(1) may also include 256 file folders that index or store event IDs 108 according to a second portion of the prefixes of the event IDs 108. In this way, as the level 1 file folders 122(1) reach the threshold limit of event IDs 108 that they are allowed or configured to store, the event IDs 108 stored in each of the level 1 file folders 122(1) may be split into 256 level 2 file folders 122(2). Once the event IDs 108 have been written to the appropriate level 2 file folders 122(2), the event-history service 104 may remove, clear, or delete the event IDs 108 from the level 1 file folder 122 to create room for new, incoming event IDs 108. In this way, new event IDs 108 that are obtained from the event IDs source 120 may be written to the level 1 file folders 122(1). However, in other examples, the event-history service 104 may write new event IDs 108 to different levels of file folders 122.

The event-history service 104 may continue to generate, or write, new levels of file folders 122 as the file folders 122 in the lowest level continue to reach the threshold limit. Thus, the event-history service 104 may write or generate level N file folders 122(N), where "N" is any integer of 2 or greater.

In this way, the event-history service 104 may create a data-storage structure, such as an N-ary tree, to index or store event IDs 108 in such a way that reading the file folders 122 to identify a specific event ID 108 requires less reads. For example, a user may utilize a requesting device 124 to submit an event request 126 to an event-history service API 128. The event request 126 may indicate that the requesting device 124 desires to view, or otherwise be provided with, event data 130 (such as metadata) that is associated with a particular event 106. In some examples, the event-history service 104 may provide user accounts with listings of the event IDs 108 for events 106 that have occurred with their accounts. The event request 126 may include an indication of the event ID 108 for which the requesting device 124 would like to be provided with event data 130. The event data 130 may include any type of data for the event 106, such as a type of the event 106 (or action), a user account or other user identity associated with the event 106, a result of the event 106, a time for the event 106, or other event data 130. The event-history service 104 may then search the file folders 122 that might be storing the event ID 108 based on the prefix of the event ID 108. For instance, if the event request 126 is a request that the event-history service 104 provide event data 130 for an event ID 108 with a prefix portion of "00-01," the event-history service 104 need only read the level 2 file folder 122(2) that stores the event IDs with a prefix of "00-01," and also the level 1 file folder 122(1) that stores event IDs 108 with a prefix of "00." In this way, the event IDs 108 may be grouped or indexed into a cascading structure of file folders 122 according to the prefix of the event ID 108.

Generally, the file folders 122, as well as the event IDs source 120, may be storage containers (e.g., buckets) that store various types of data, such as objects. In various examples, the file folders may be provided for use as part of a storage service 112 offered by the service provider network 102, such as an object storage offering.

In some examples, the number of file folders 122 may be scaled back, or otherwise removed from storage. For example, the event-history service 104 may maintain event IDs 108 and event data 130 for specific periods of time, and delete the IDs and/or data to keep room. For instance, the event-history service 104 may store the event IDs 108 and event data 130 for 90 days, and then remove the data from storage to save room. Accordingly, in some examples, a particular user account may have had large amounts of events 106 occurring during a period of time such that more file folders 122 were required to store the event IDs 108. However, the event 106 traffic may have reduced significantly for the user account such that event IDs 108 and/or event data 130 is removed from storage leaving low, or completely empty, file folders 122. In such examples, the event-history service 104 may remove and/or combine file folders 122 from storage and reduce the cascading structure of file folders 122.

Figure 2:
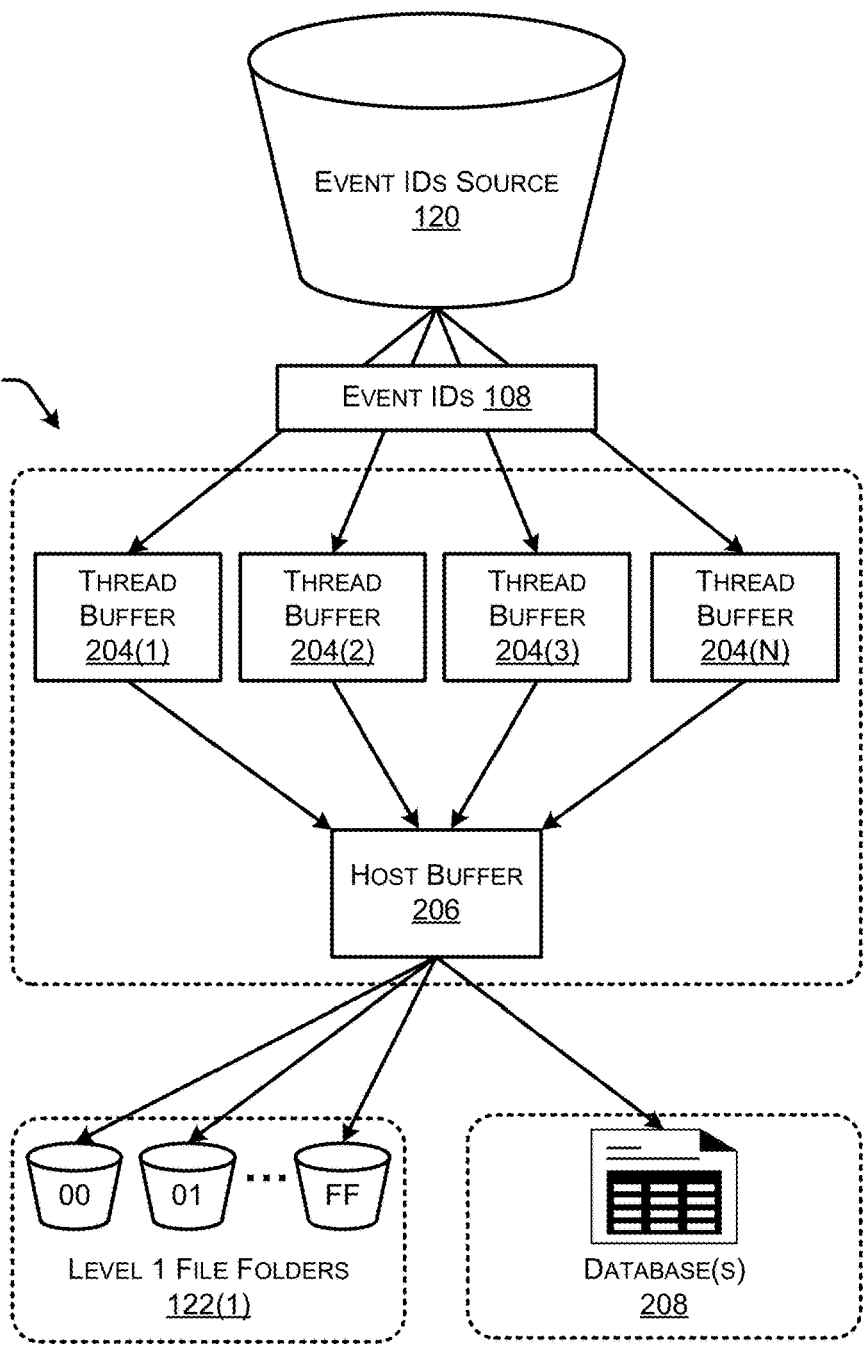
FIG. 2 illustrates a diagram of an example environment in which event IDs are stored in thread buffers, fed into a host buffer, and written to file folders in batches according to the prefixes of the event IDs.

FIG. 2 illustrates a diagram of an example environment in which event IDs 108 are ingested as part of an event ID ingestion process 202 in which the event IDs 108 are stored in one or more thread buffers 204, fed into a host buffer 206, and written to file folders 122 in batches according to the prefixes of the event IDs 108.

As illustrated, the event IDs 108 are initially batched together in multiple threads 204, or in thread-local storage. Once the thread buffers 204 has a local list of event IDs 108 that exceeds a configured, or threshold, size, the list of event IDs 108 then get synchronously merged into a host-level buffer 206. Once the host buffer 206 fills up, or stores a list of event IDs 108 that is greater than or equal to a preconfigured threshold of maximum, the host buffer 206 may get asynchronously dumped to the level 1 file folders 122(1), and further indexed in one or more databases 208 provided by the managed-database service 112(3). In some examples, the database(s) 208 may receive messages indicating each event ID 108 that has been batched, or dumped, into the level 1 file folders 122(1) to ensure that the event ID 108 file has been stored in the level 1 file folders 122(1). If the database(s) 208 indicate that an event ID 108 has not been stored (e.g., the database(s) 208 does not contain the entry), then the missing event ID 108 is rewritten to the level 1 file folders 122(1).

In some examples, event-history service 104 may sort the event IDs 108 in the host buffer 206 according to the prefixes. In this way, when the event IDs 108 in the host buffer 206 are dumped or written in the level 1 file folders 122(1), the event IDs 108 may be written based on the sorted list of event IDs 108 (e.g., in order, in batches, etc.). For example, batches of event IDs 108 with corresponding prefixes may be dumped in a single write to the appropriate level 1 file folder 122(1). The event IDs 108 may be sorted in the thread buffers 204 and/or in the host buffer such that event IDs 108 that the event IDs 108 with corresponding, or the same, prefix portions may be batched together and written to the appropriate level 1 file folder 122(1) in a single write, or lesser amounts of writes.

In some examples, after writing a batch of event IDs 108 to a file folder 122 from the host buffer 206, the event-history service 104 may list the event IDs 108 in the databases(s) 208. In this way, the files (e.g., event Ids 108 and/or event data 130) may be indexed in the database(s) 208.

Figure 3A:
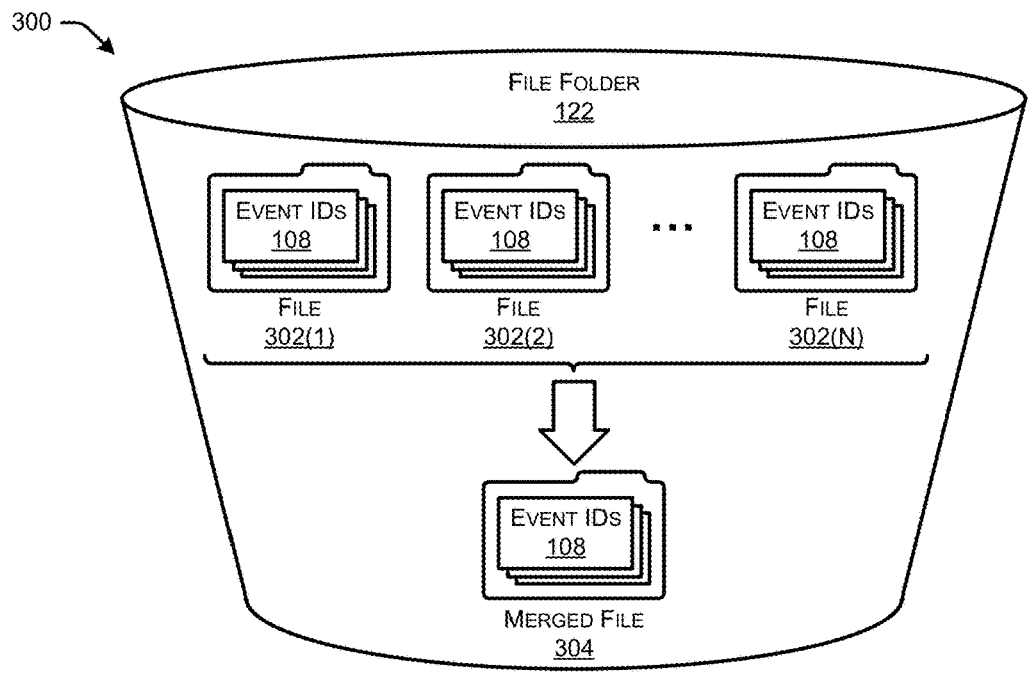
FIG. 3A illustrates a diagram of an example file folder that includes sub folders that store groups of event IDs that reach a threshold number of event IDs, and are merged into a merged folder of event IDs.

FIG. 3A illustrates a diagram 300 of an example file folder 122 that stores files 302 that each store groups of event IDs 108 that reach a threshold number of event IDs 108, and are merged into a merged file 304 of event IDs 108. Each of the files 302(1), 302(2), and 302(N) may be files that store groupings of event IDs 108. In some examples, the files 302 may each simultaneously stream event IDs 108 from the host buffer 206. The event-history service 104 may determine that if the file folder 122 contains at least some threshold number of files 302 (e.g., "N"), but that the files 302 contain less than some threshold number of event IDs 108 (e.g., "M"). The event-history service 104 may then determine to merge the files 302 into a merged file 304 that includes all of the event IDs 302 of the files 302. In this way, the event-history service 104 may generate larger, merged files 304, but are able to determine that they will not exceed the threshold number of event IDs 108 that the file folder 122 is configured to store before splitting. Rather than streaming individual event IDs 108 from the host buffer 206, and/or smaller files 302 of event IDs 108, the file folder 122 may receive, in a write, a merged file 304 including a larger number of event IDs 108.

Figure 3B:
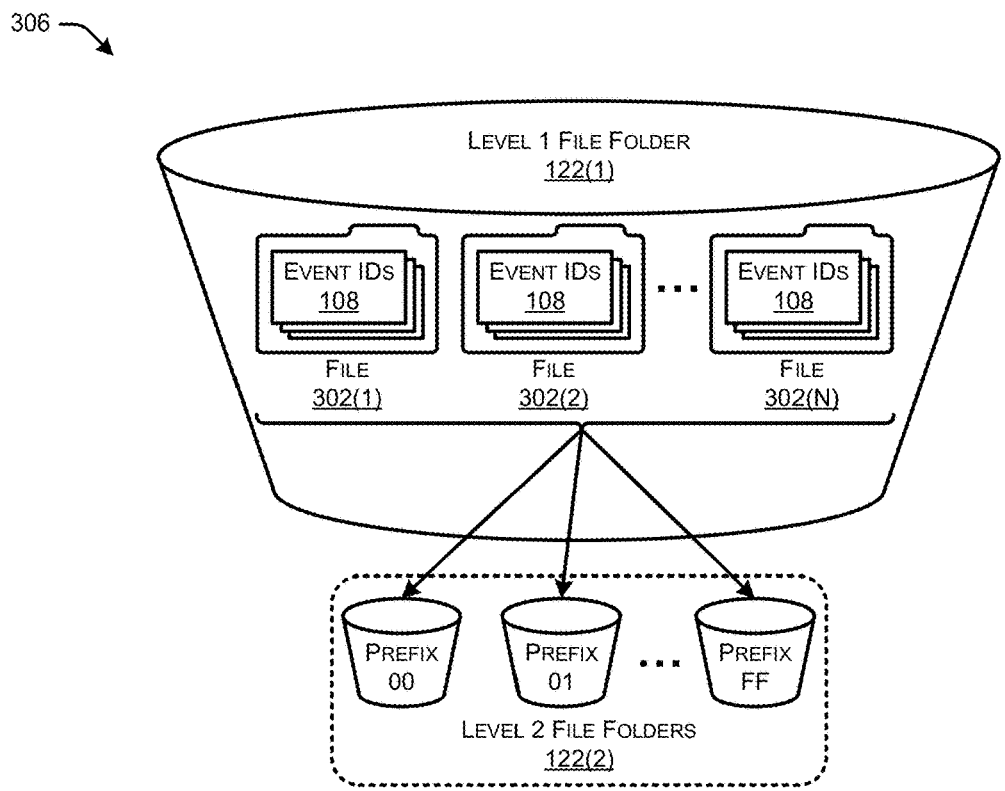
FIG. 3B illustrates a diagram of an example first level file folder that includes sub folders that store group of event IDs that reach a threshold number of event IDs, and are then written to a second level of file folders.

FIG. 3B illustrates a diagram 306 of an example level 1 file folder 122(1) that includes files 302 that store group of event IDs 108 that reach a threshold number of event IDs 108, and are then written to level 2 file folders 122(2).

In some examples, the event-history service 104 may monitor, such as by the database(s) 208, a number of event IDs 108 stored in files 302 of a level 1 file folder 122(1). The may determine that if the level 1 file folder 122(1) includes at least a threshold number of sub files 302 (e.g., "P") that are greater than a threshold size (e.g., "M"), then the event-history service 104 may determine to merge all of the event IDs 108 in the files 302 and split them into the appropriate level 2 file folders 122(2) according to the prefixes of the event IDs 108. In this way, the event-history service 104 may determine that the level 1 file folder 122(1) has enough event IDs 108 to warrant splitting the event IDs 108 into the level 2 file folders 122(2). In some examples, the event-history service 104 may then clear the event IDs 108 from the level 1 file folder 122(1). In some examples, the event-history service 104 may simply determine that a number of the event IDs 108 in the level 1 file folder 122(1) has exceeded a threshold, and write the event IDs 108 into the level 2 file folders 122(2).

Figure 4:
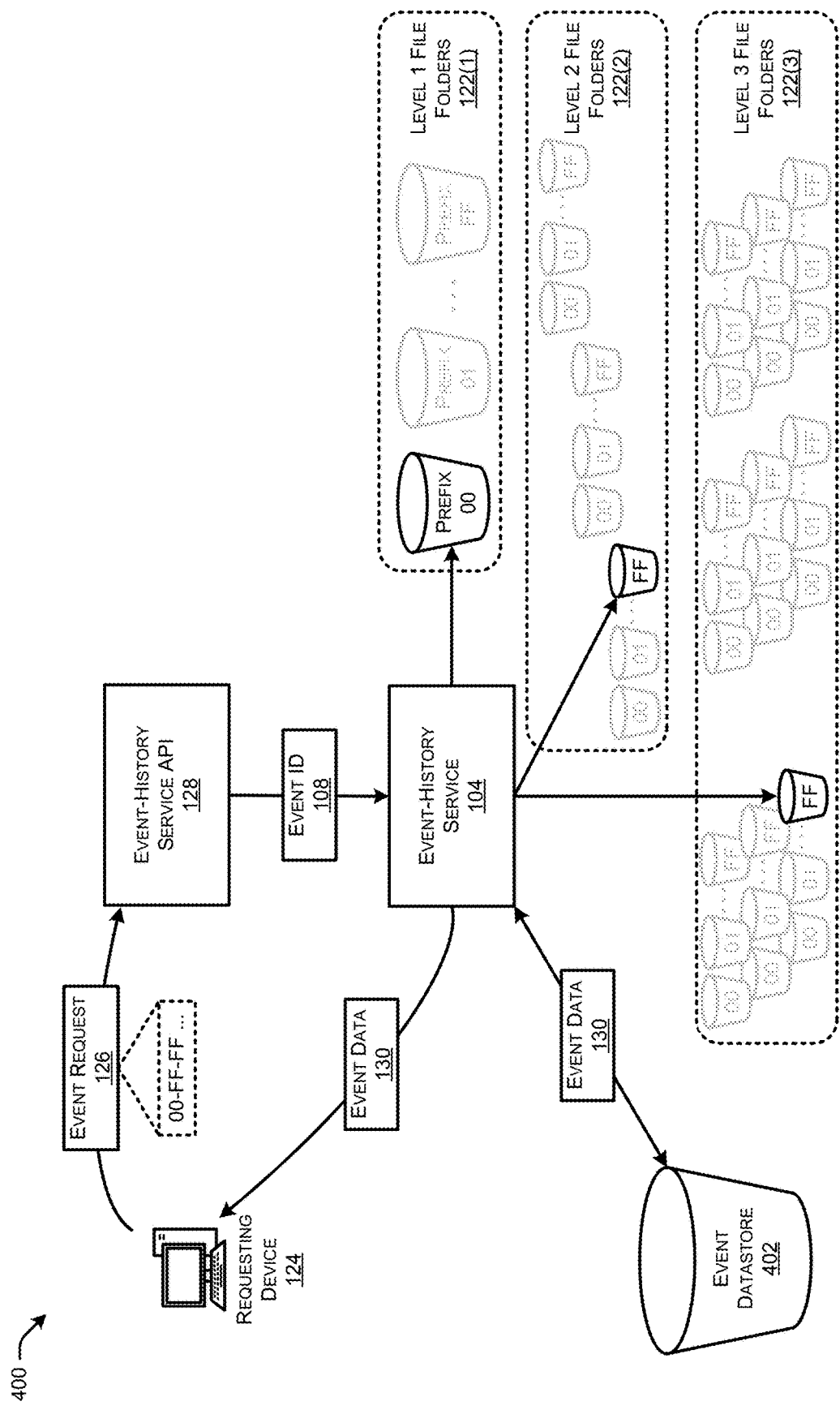
FIG. 4 illustrates a diagram of an example environment in which a service provider network reads event IDs from storage to retrieve event metadata for a user request.

FIG. 4 illustrates a diagram of an example environment 400 in which an event-history service 104 of a service provider network 102 reads event IDs 108 from storage to retrieve event metadata for a user request.

In some examples, a requesting device 124 may submit an event request 126 to an event-history service API 128. The event request 126 may indicate that the requesting device 124 desires to view, or otherwise be provided with, event data 130 (such as metadata) that is associated with a particular event 106. In some examples, the event-history service 104 may provide user accounts with listings of the event IDs 108 for events 106 that have occurred with their accounts. The event request 126 may include an indication of the event ID 108 for which the requesting device 124 would like to be provided with event data 130. In the illustrated example, the event request indicates that the event ID 108 has a prefix of "00-FF-FF," followed by suffix information. Also illustrated, there are 3 levels of file folders 122(3). Accordingly, the event-history service 104 may determine, based on the prefix of the event ID 108, to search the level 1 file folder 122(1) corresponding to prefixes with first portions of "00," to search the level 2 file folder 122(2) corresponding to prefixes with second portions of "00-FF," and to search the level 3 file folder 122(3) corresponding to prefixes of "00-FF-FF." In this example, the event-history service 104 may only need to search 3 file folders 122 out of potentially millions of file folders 122. To search or read the 3 file folders 122, the event-history service 104 may fan out using different threads that performs binary searches within the file to find an event ID 108 that corresponds to the event ID 108 in the event request 126. Upon finding the matching event ID 108 in one of the 3 file folders 122, the event-history service 104 may identify the associated event data 130. For example, the event ID 108 may be a key in a key-value pair where the value comprises the actual event data 130, or a pointer to the storage location of the event data 130. For example, the value may be a pointer that indicates a storage location of the event data 130 in an event data store 402. The event-history service 104 may obtain the event data 130, and provide the event data 130 to the requesting device 124 to access via the user account. The event-history service 104 may provide the event data 130 in various ways, such as through a user interface accessible by logging into a console via a user account, email, or any other electronic communication means.

The event data 130 may include any type of data for the event 106, such as a type of the event 106 (or action), a user account or other user identity associated with the event 106, a result of the event 106, a time for the event 106, or other event data 130.

Figure 5:
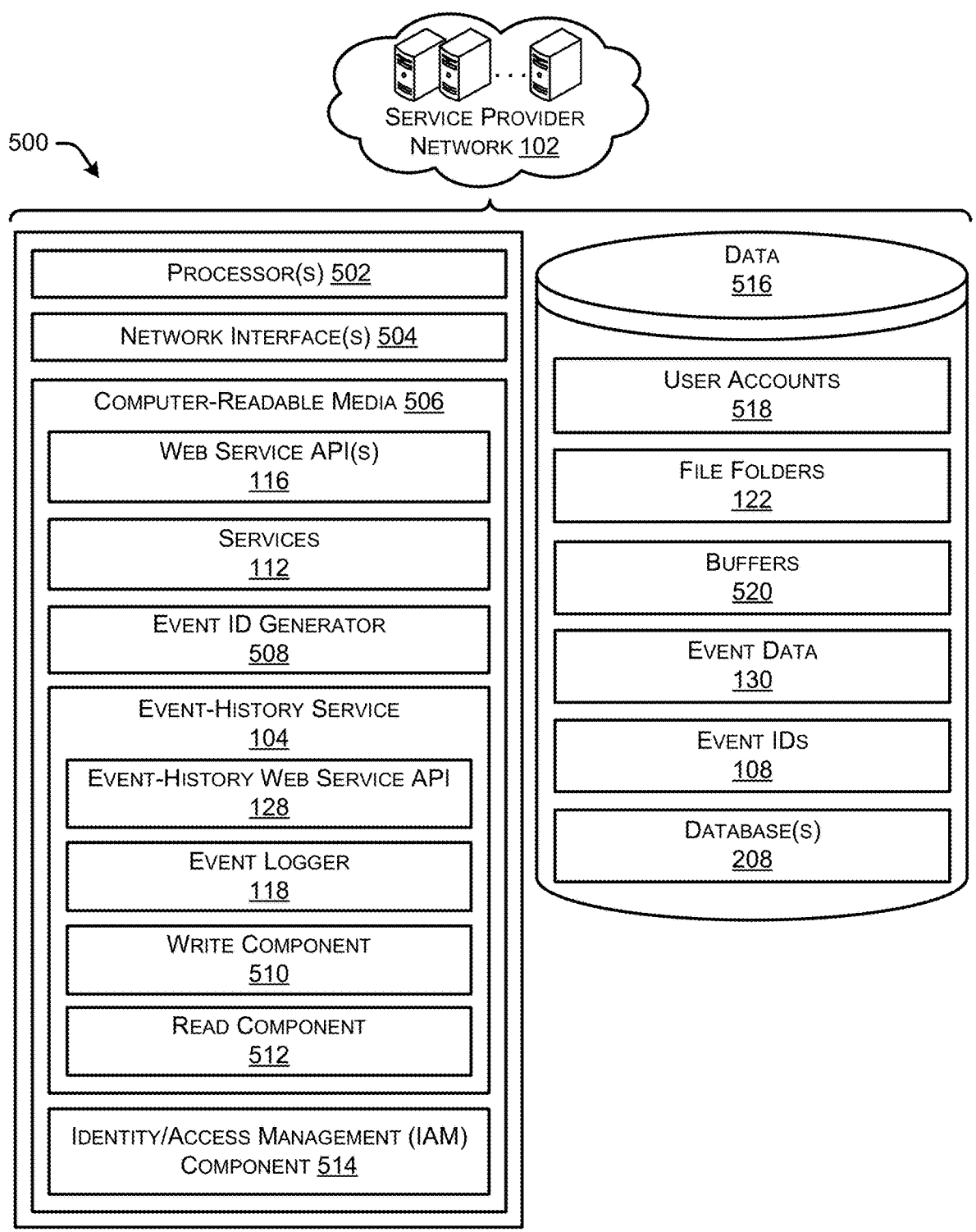
FIG. 5 illustrates a component diagram illustrating example components of a service provider network.

FIG. 5 illustrates a component diagram illustrating example components of a service provider network.

As illustrated, the service provider network 102 may include one or more hardware processors 502 (processors) configured to execute one or more stored instructions. The processor(s) 502 may comprise one or more cores. Further, the service provider network 102 may include one or more network interfaces 504 configured to provide communications between the service provider network 102 and other devices, such as the user device(s) 110/124. The network interfaces 504 may include devices configured to couple to personal area networks (PANs), wired and wireless local area networks (LANs), wired and wireless wide area networks (WANs), and so forth. For example, the network interfaces 504 may include devices compatible with Ethernet, Wi-Fi™, and so forth.

The service provider network 102 may also include computer-readable media 506 that stores various executable components (e.g., software-based components, firmware-based components, etc.). In addition to various components discussed in FIG. 1, the computer-readable-media 506 may further store components to implement functionality described herein.

For example, the computer-readable media 506 may store an event ID generator 508 that generates the event IDs 108 according to a predefined nomenclature. The event IDs may be any type of string of text, such as numbers, characters, symbols, or any combination thereof that can be used as an identifier. In some examples, the event ID generator 508 may generate the event IDs that include universal uniform identifiers (UUIDs) which are randomly or semi-randomly generated such that the event IDs 108 will not collide. However, the event IDs 108 may include any type of identifier. In some examples, the event ID generate may generate the event IDs 108 that have a suffix portion including the UUID that is used to identify the event data 130, and according to a predefined nomenclature that includes a prefix for assigning the event IDs 108 to one of the file folders. In some examples, the prefix may include one or more bits or numbers that can be used to sort the event IDs into file folders. For example, the event IDs may be generated to include respective prefixes that are defined according to hexadecimal, such as "00," "01," through "FF" to split the event IDs into groupings of 256. In such examples, the event-history service may generate and store 256 file folders that may each be assigned to (or named for) a respective prefix of the event IDs such that event IDs are stored, indexed, or written to the file folder that corresponds to their prefix. However, the prefix portion may be defined according to any identification scheme. The event ID generator 508 may identify the events 106, and generate corresponding event IDs 108 that identify the event data 130 for the events 106.

In addition to the event-history web service API 128 and event logger 118, the event-history service 104 may further include a write component 510 configured to write data into storage and/or memory, and a read component 512 configured to read data from storage and/or memory. The write component 510 and read component 512 may write and read data according to any technique to implement the functionality described herein.

The computer-readable media 506 may further store an identity/access management (IAM) component 514. The IAM component 216 may be executable by the processor(s) 502 to perform various operations. For example, to utilize the services provided by the service provider network 102, a user may register for an account with the service provider network 102. For instance, users may utilize their devices 110 to interact with the IAM component 514 that allows the users to create user accounts 518 with the service provider network 102. Generally, the IAM component 514 may enable users to manage access to their cloud-based services and computing resources securely. Using the IAM component 514, users can provide input, such as events 106, for use of the service provider network 102. Each user that is permitted to interact with services associated with a particular account 518 may have a user identity/profile assigned to them. In this way, users may log in with sign-in credentials to their account(s) 508, perform operations, such as performing an event 106 to manage a service 112. By having the users perform events 106 via their user accounts 518, the event-history service 104 is able to sort the event IDs 108 according to the user accounts 518.

The service provider network 102 may include or store various types of data 516, such as the user accounts 518, file folders 122, buffers 520, event data 130, event IDs 108, and databases 208. The buffers 520 may include any type of buffer, such as the thread buffers 204 and host buffers 206. Generally, the file folders 122 may be any type of storage resource that generally groups data, such as object storage.

FIGS. 6A, 6B, 7, and 8 illustrate flow diagrams of example methods 600, 700, and 800 that illustrate aspects of the functions performed at least partly by the event-history service 104 as described in FIGS. 1-5. The logical operations described herein with respect to FIGS. 6A, 6B, 7, and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, 7, and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 6A:
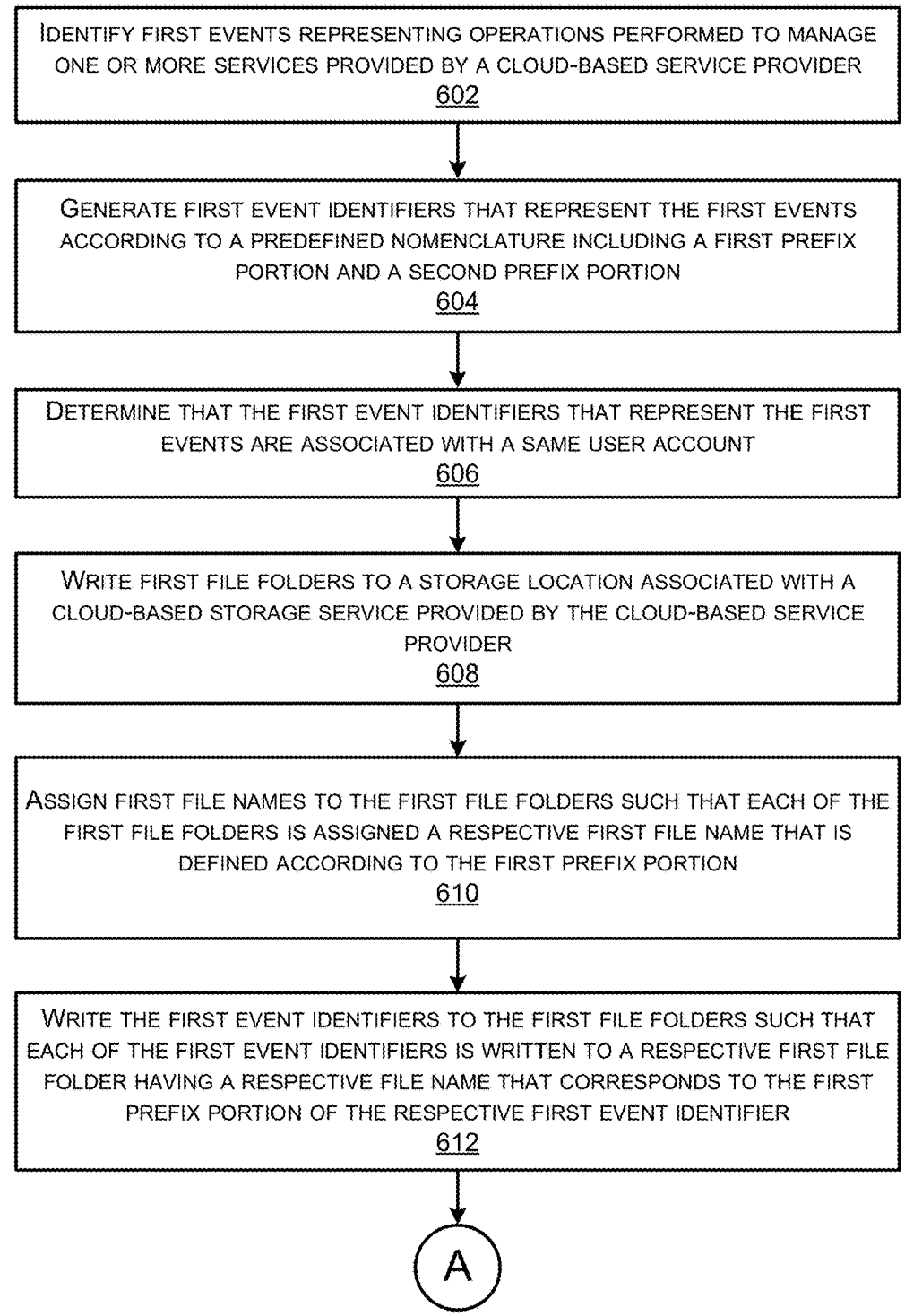
FIGS. 6A and 6B illustrate a flow diagram of an example method performed by a service provider network for identifying event IDs for events, writing the event IDs to a first level file folder, determining that the first level file folder has reached a threshold of event IDs, and writing the event IDs to a second level file folder.
Figure 6B:
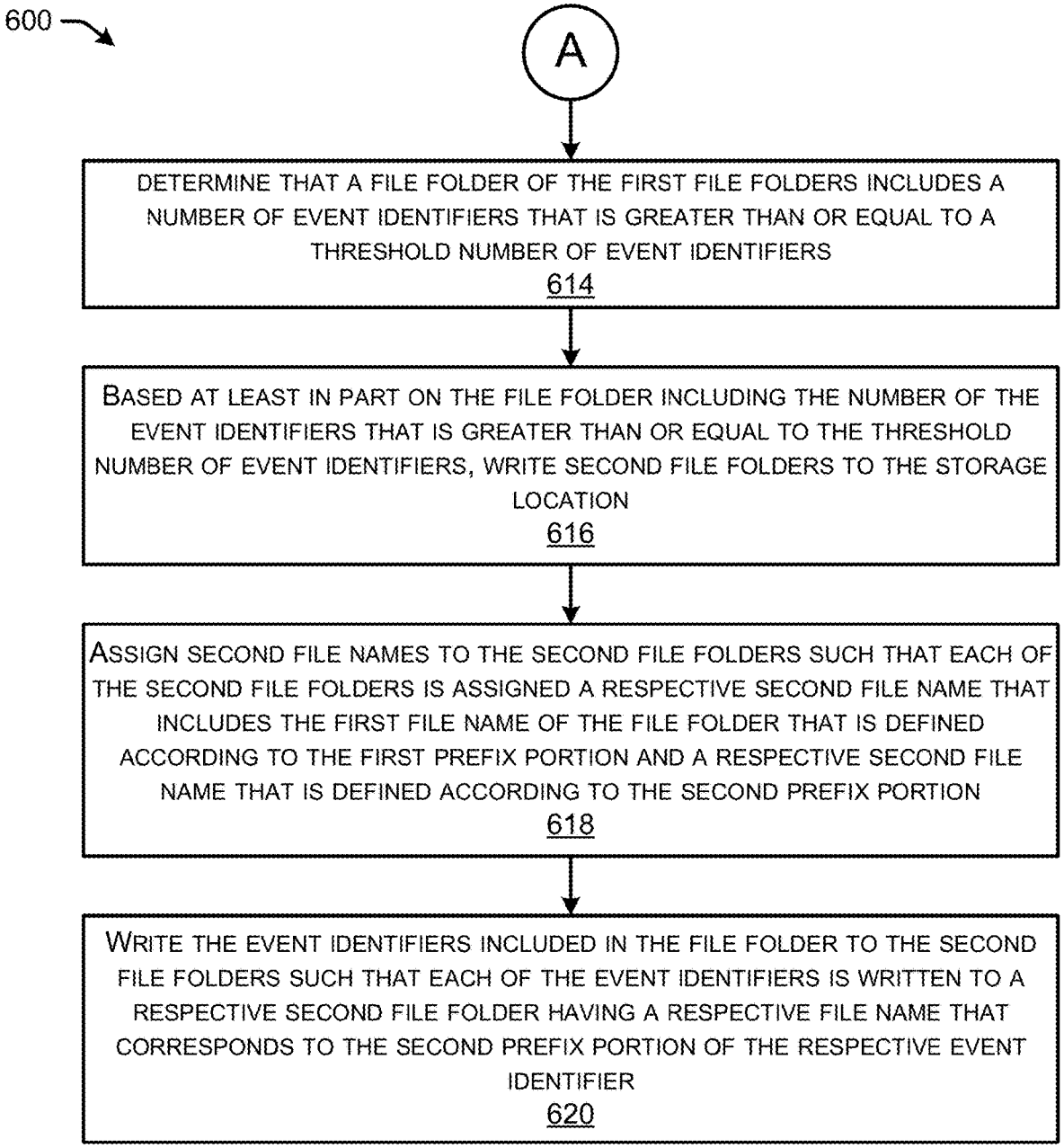

FIGS. 6A and 6B illustrate a flow diagram of an example method 600 performed by a service provider network for identifying event IDs for events, writing the event IDs to a first level file folder, determining that the first level file folder has reached a threshold of event IDs, and writing the event IDs to a second level file folder.

At 602, a service provider network 102 may identify first events representing operations performed to manage one or more services provided by a cloud-based service provider. For instance, the event logger 118 may identify first events 106 representing operations performed to manage a service 112.

At 604, the service provider network 102 may generate first event identifiers that represent the first events according to a predefined nomenclature including a first prefix portion and a second prefix portion. As an example, the event ID generator 508 may generate first event IDs 108 that represent the first events 106 (e.g., associated with event data 130) and include prefix portions (e.g., "00," "01," etc.).

At 606, the service provider network 102 may determine that the first event identifiers that represent the first events are associated with a same user account. For instance, the events 106 may be performed while a user is logged into their user accounts 518, and the service provider network 102 may determine which user accounts 518 performed which events 106 that correspond to the event IDs 108.

At 608, the service provider network 102 may write first file folders 122 to a storage location associated with a cloud-based storage service provided by the service provider network 102 (e.g., cloud-based service provider). For instance, the write component 510 may create, generate, and/or write the file folders 122 to a storage location.

At 610, the service provider network 102 may assign first file names to the first file folders such that each of the first file folders is assigned a respective first file name that is defined according to the first prefix portion. In some examples, the file names may comprise indications or configurations as to what event IDs 108 the file folders 122 are to store.

At 612, the service provider network 102 may write the first event identifiers to the first file folders such that each of the first event identifiers is written to a respective first file folder having a respective file name that corresponds to the first prefix portion of the respective first event identifier. For example, event IDs 108 with a first prefix portion of "00" may be written to a file folder 122, such as in a batch, that is configured or assigned to store event IDs 108 with prefix portions of "00" as well.

At 614, the service provider network 102 may determine that a file folder of the first file folders includes a number of event identifiers that is greater than or equal to a threshold number of event identifiers. For instance, the file folders 122 may be configured to store no more than a threshold number of event IDs 108.

At 616, the service provider network 102 may, based at least in part on the file folder including the number of the event identifiers that is greater than or equal to the threshold number of event identifiers, write second file folders to the storage location.

At 618, the service provider network 102 may assign second file names to the second file folders such that each of the second file folders is assigned a respective second file name that includes the first file name of the file folder that is defined according to the first prefix portion and a respective second file name that is defined according to the second prefix portion.

At 620, the service provider network 102 may write the event identifiers included in the file folder to the second file folders such that each of the event identifiers is written to a respective second file folder having a respective file name that corresponds to the second prefix portion of the respective event identifier. In some examples, the service provider network 102 may further remove the event identifiers from being included in the file folder. In this way, the file folder 122 is clear and ready to have new event IDs 108 written to it.

In some examples, the process 600 may further include determining that a number of sub-files included in the file folder is greater than or equal to a threshold number of sub-files. Further, the service provider network 102 may determine that each of the sub-files includes a respective number of event identifiers that is less than a second threshold number of event identifiers. Additionally, the service provider network 102 may merge the sub-files to generate a merged file that includes the event identifiers of each of the sub-files.

In some examples, the service provider network 102 may further, as process 600, sort the event identifiers included in the file folder based at least in part on the respective first file names of the event identifiers to generate a sorted list of the event identifiers. In such examples, writing the event identifiers to the second file folders is performed according to the sorted list of the event identifiers.

Figure 7:
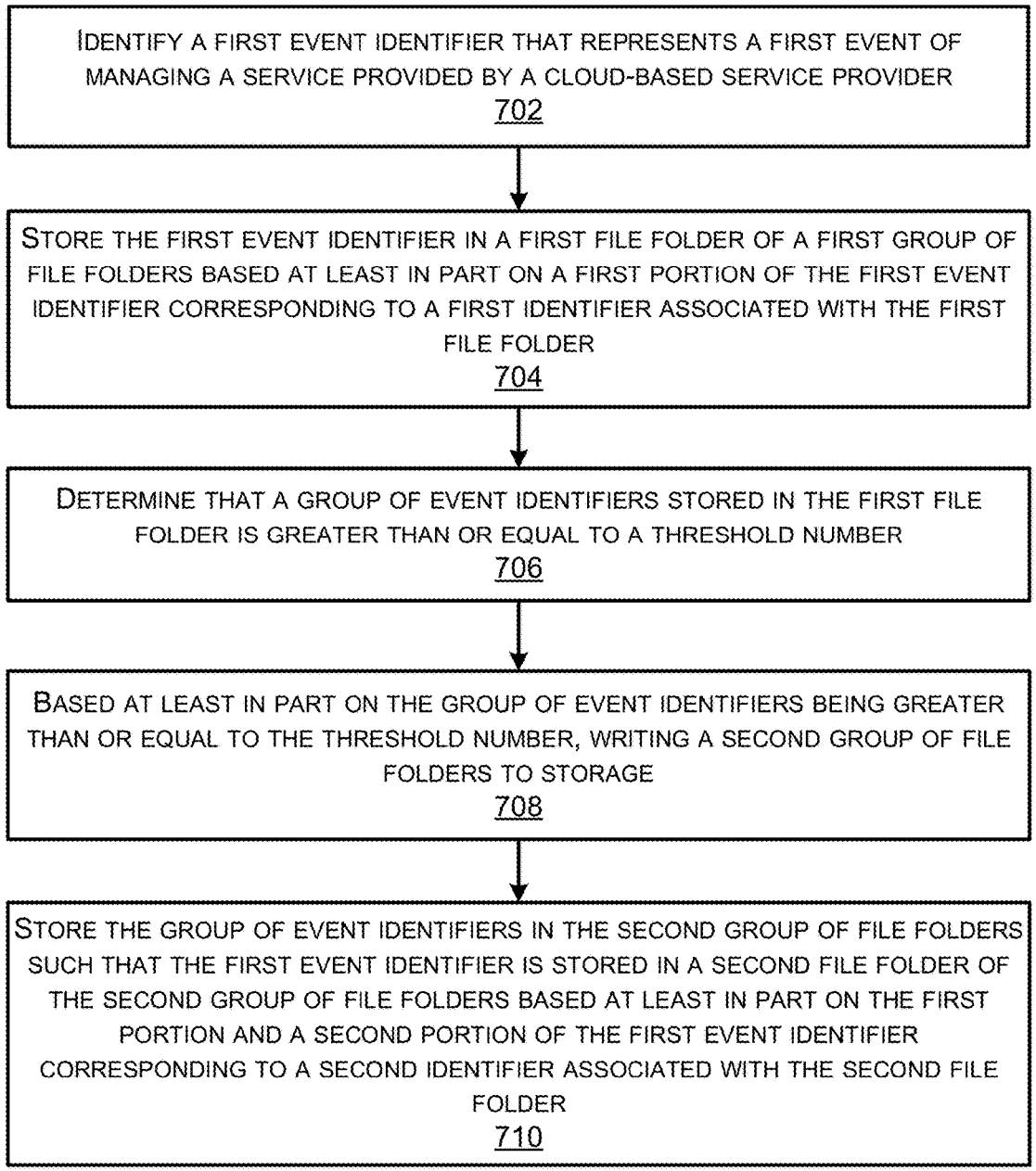
FIG. 7 illustrates a flow diagram of an example method performed by a service provider network for storing an event identifier in a file folder, determining that the file folder is storing more than a threshold number of event IDs, and storing the event IDs in a group of next level file folders.

FIG. 7 illustrates a flow diagram of an example method 700 performed by a service provider network for storing an event identifier in a file folder, determining that the file folder is storing more than a threshold number of event IDs, and storing the event IDs in a group of next level file folders.

At 702, a service provider network 102 may identify a first event identifier that represents a first event of managing a service provided by a cloud-based service provider. For instance, the event history-service 104 may identify the first event ID 108 from the event IDs source 120, and/or from a buffer.

At 704, the service provider network 102 may store the first event identifier in a first file folder of a first group of file folders based at least in part on a first portion of the first event identifier corresponding to a first identifier associated with the first file folder. For instance, the service provider network 102 may store the first event ID 107 in a level 1 file folder 122(1) that corresponds to a portion of the first event ID 108.

At 706, the service provider network 102 may determine that a group of event identifiers stored in the first file folder is greater than or equal to a threshold number. At 708, the service provider network 102 may, based at least in part on the group of event identifiers being greater than or equal to the threshold number, writing a second group of file folders to storage. For example, the service provider network 102 may generate and write the level 2 file folders 122(2) to storage.

At 710, the service provider network 102 may store the group of event identifiers in the second group of file folders such that the first event identifier is stored in a second file folder of the second group of file folders based at least in part on the first portion and a second portion of the first event identifier corresponding to a second identifier associated with the second file folder. For example, the service provider network 102 may cause some, or all, of the event IDs 108 in the level 1 file folder 122 to be written to one or more level 2 file folders 122(2).

In some examples, the service provider network 102 may further, as part of process/method 700, remove the group of event identifiers from being stored in first file folder, identify a second event identifier that represents a second event associated, and store the second event identifier in the first file folder based at least in part on a first portion of the second event identifier corresponding to the first identifier associated with the first file folder.

In further examples, the service provider network 102 may store event metadata representing the first event at a storage location indicated by the first event identifier, receive, via a user account associated with the service, a request for the metadata corresponding to the first event, wherein the request for the metadata includes an indication of the first event identifier, download (e.g., read) the first file folder and the second file folder based at least in part on the first identifier corresponding to the first portion of the first event identifier and the second identifier corresponding to the first portion and the second portion of the first event identifier, search the first file folder and the second file folder to identify the first event identifier as being stored in the second file folder, determine the storage location of the event metadata based at least in part on the first event identifier indicating the storage location, and provide the event metadata for access by the user account.

In some instances, the service provider network 102 may analyze a buffer to determine that a buffered group of event identifiers is greater than or equal to a second threshold number, wherein the buffered group of event identifiers includes the first event identifier, sort the buffered group of event identifiers according to respective first portions of the event identifiers in the buffered group of event identifiers to generate a sorted list, and store, in the first group of file folders, individual event identifiers in the buffered group of event identifiers according to the sorted list.

Figure 8:
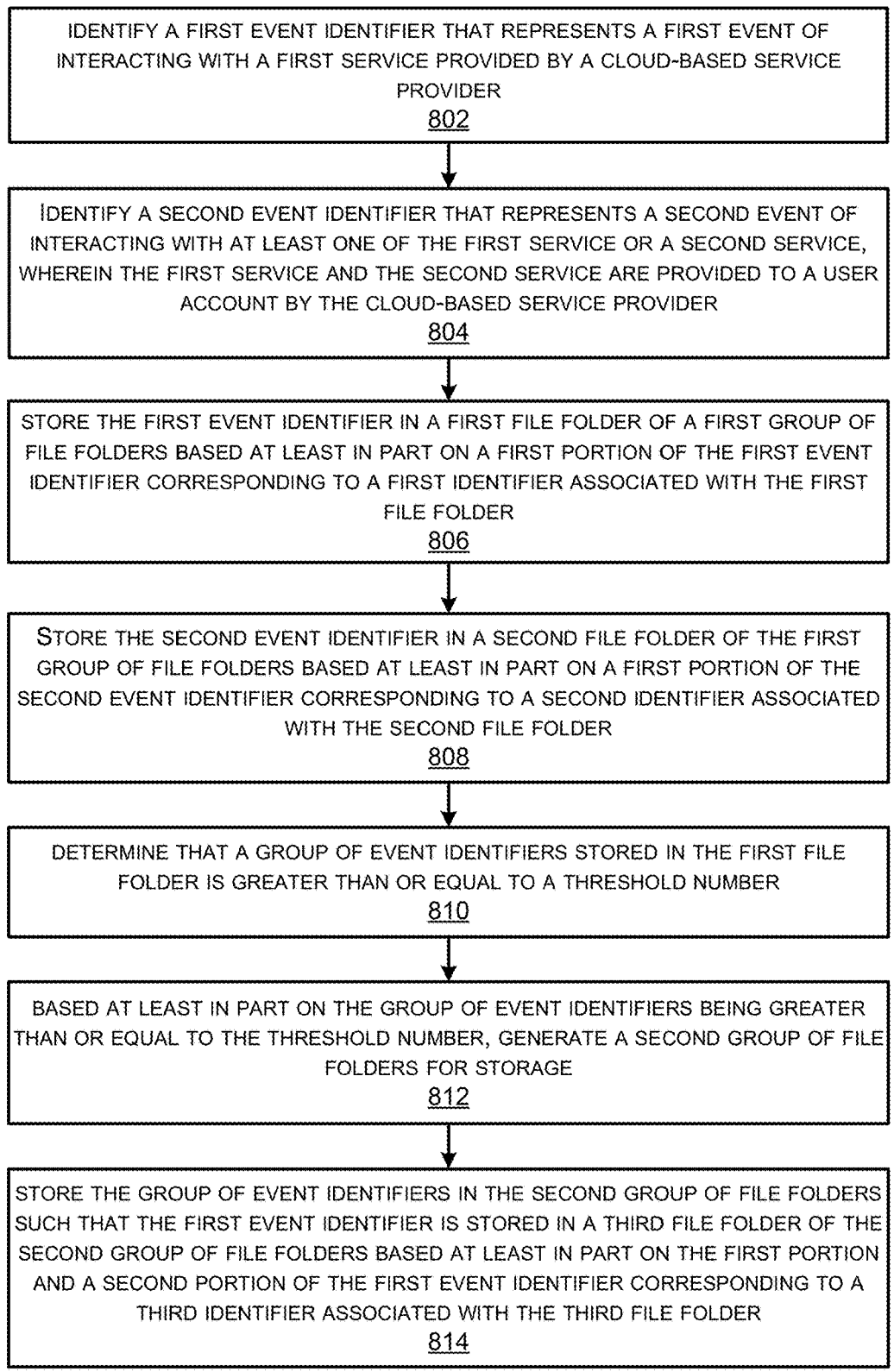
FIG. 8 illustrates a flow diagram of an example method performed by a service provider network for storing two event IDs in respective file folders, determining that one of the file folders is storing more than a threshold number of event IDs, and writing the event IDs in the file folder to a second level of file folders.

FIG. 8 illustrates a flow diagram of an example method 800 performed by a service provider network for storing two event IDs in respective file folders, determining that one of the file folders is storing more than a threshold number of event IDs, and writing the event IDs in the file folder to a second level of file folders.

At 802, the service provider network 102 may identify a first event identifier that represents a first event of interacting with a first service provided by a cloud-based service provider. At 804, the service provider network 102 may identify a second event identifier that represents a second event of interacting with at least one of the first service or a second service, wherein the first service and the second service are provided to a user account by the cloud-based service provider. For instance, the service provider network 102 may identify the first and second event IDs 108 from the event IDs source 120, and/or from a buffer.

At 806, the service provider network 102 may store the first event identifier in a first file folder of a first group of file folders based at least in part on a first portion of the first event identifier corresponding to a first identifier associated with the first file folder At 808, the service provider network 102 may store the second event identifier in a second file folder of the first group of file folders based at least in part on a first portion of the second event identifier corresponding to a second identifier associated with the second file folder.

At 810, the service provider network 102 may determine that a group of event identifiers stored in the first file folder is greater than or equal to a threshold number. At 812, the service provider network 102 may, based at least in part on the group of event identifiers being greater than or equal to the threshold number, generate a second group of file folders for storage.

At 814, the service provider network 102 may store the group of event identifiers in the second group of file folders such that the first event identifier is stored in a third file folder of the second group of file folders based at least in part on the first portion and a second portion of the first event identifier corresponding to a third identifier associated with the third file folder.

Figure 9:
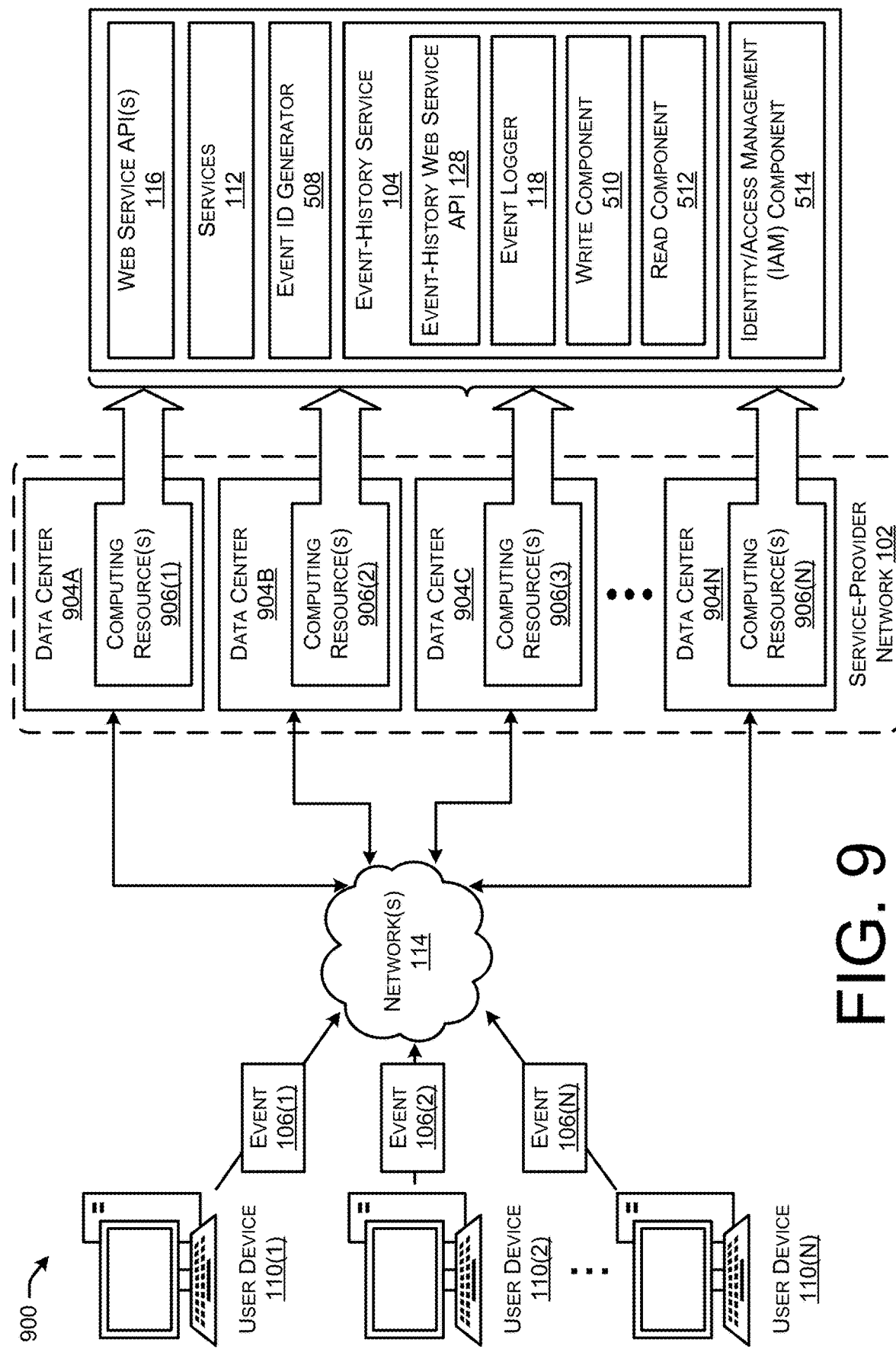
FIG. 9 illustrates a system and network diagram that shows an illustrative operating environment that includes a service provider network that can be configured to implement aspects of the functionality described herein.

FIG. 9 is a system and network diagram that shows an illustrative operating environment 900 that includes a service-provider network 102 (that may be part of or associated with a cloud-based service network/platform) that can be configured to implement aspects of the functionality described herein.

The service-provider network 102 can provide computing resources 906, like VM instances and storage, on a permanent or an as-needed basis. Among other types of functionality, the computing resources 906 provided by the service-provider network 102 may be utilized to implement the various services described above. The computing resources provided by the service-provider network 102 can include various types of computing resources, such as data processing resources like VM instances, data storage resources, networking resources, data communication resources, application-container/hosting services, network services, and the like.

Each type of computing resource provided by the service-provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 102 can also be configured to provide other types of computing resources not mentioned specifically herein.

The computing resources 906 provided by the service-provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative embodiment for a data center 904 that can be utilized to implement the technologies disclosed herein will be described below with regard to FIG. 10.

The data centers 904 may be configured in different arrangements depending on the service-provider network 102. For example, one or more data centers 904 may be included in or otherwise make-up an availability zone. Further, one or more availability zones may make-up or be included in a region. Thus, the service-provider network 102 may comprise one or more availability zones, one or more regions, and so forth. The regions may be based on geographic areas, such as being located within a predetermined geographic perimeter.

The users and/or admins of the service-provider network 102 may access the computing resources 906 provided by the data centers 904 of the service-provider network 102 over any wired and/or wireless network(s) 114 (utilizing a user device 110 and/or another accessing-user device), which can be a wide area communication network ("WAN"), such as the Internet, an intranet or an Internet service provider ("ISP") network or a combination of such networks. For example, and without limitation, a device operated by aa user of the service-provider network 102 may be utilized to access the service-provider network 102 by way of the network(s) 114. It should be appreciated that a local-area network ("LAN"), the Internet, or any other networking topology known in the art that connects the data centers 904 to remote clients and other users can be utilized. It should also be appreciated that combinations of such networks can also be utilized.

As illustrated in FIG. 9, the service-provider network 102 may be configured to support some or all of the components of the event-history service 104. For example, the computing resources 906 in one or all of the data centers 904 may provide the resources to store and/or execute the components of the event-history service 104.

Figure 10:
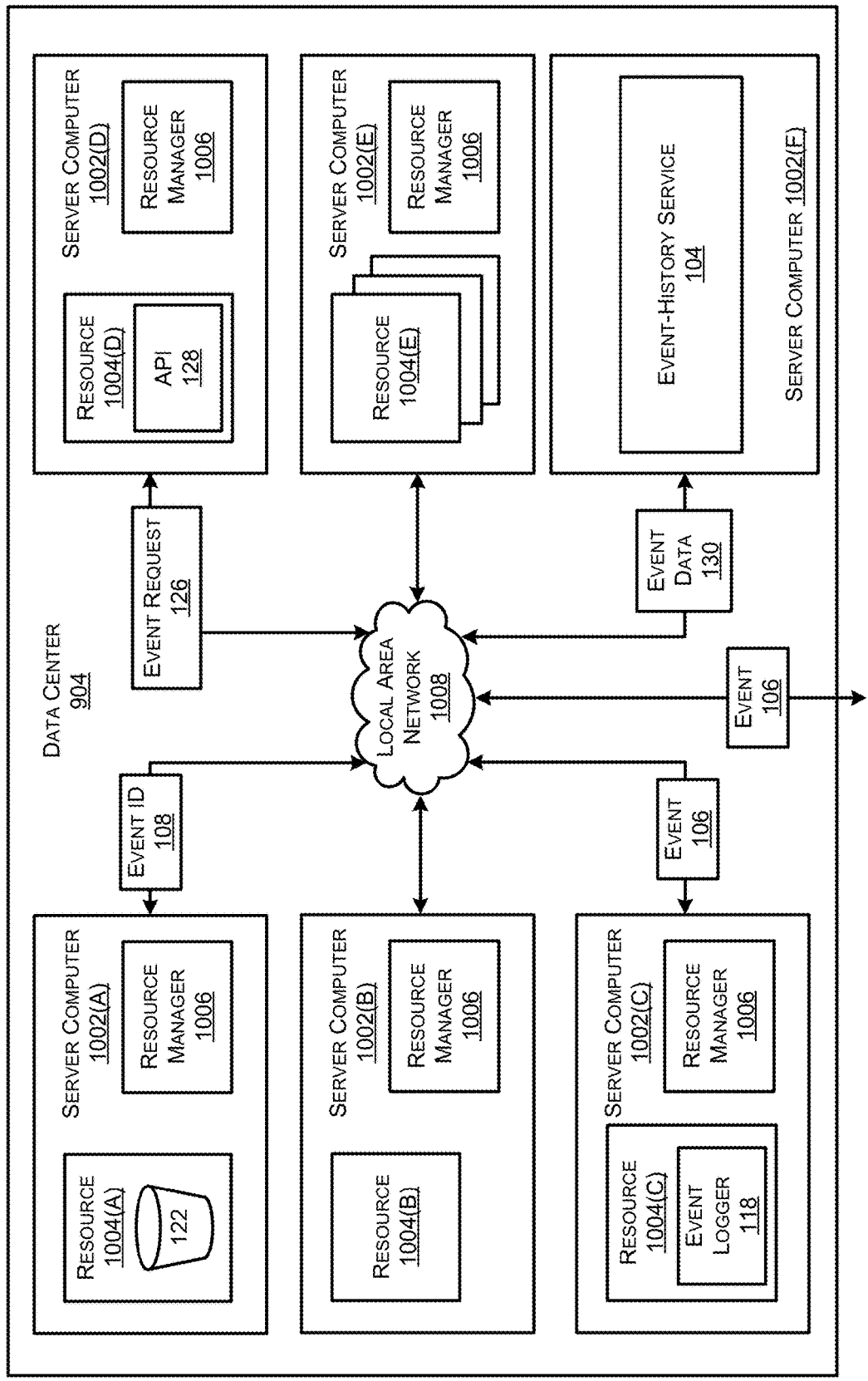
FIG. 10 illustrates a computing system diagram illustrating a configuration for a data center that can be utilized to implement aspects of the technologies disclosed herein.

FIG. 10 is a computing system diagram illustrating a configuration for a data center 904 that can be utilized to implement aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, or correspond to, the computing resources 906 described herein.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service-provider network 802 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 904 can also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations can be utilized.

As illustrated, various data may be sent throughout the data center 904 over the LAN 1008, such as events 106, event IDs 108, event requests 126, and/or event data. Additionally, the resources 1004 may store or otherwise support different aspects of the event-history service 104 described herein.

Figure 11:
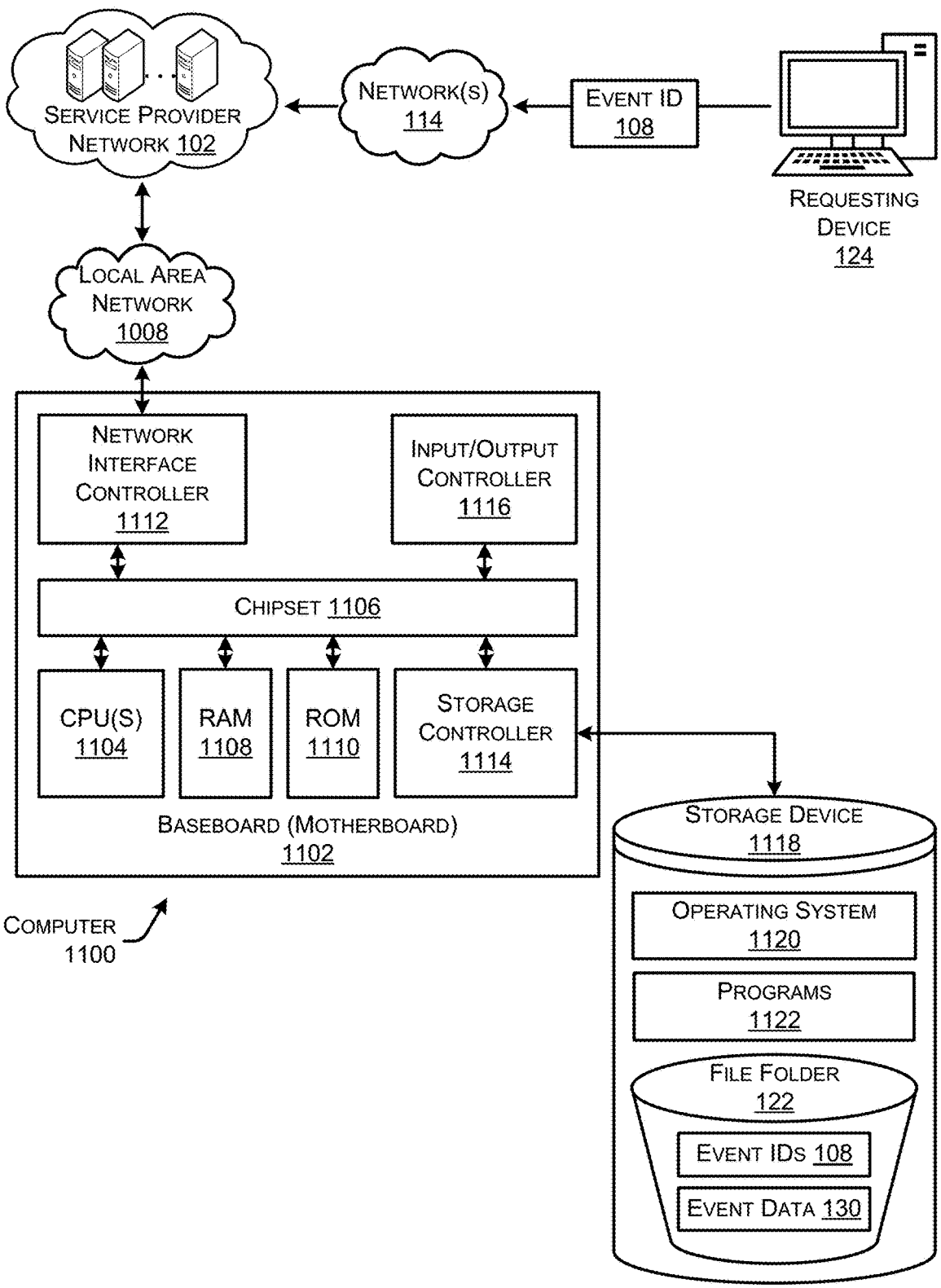
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1008. The chipset 1106 can include functionality for providing network connectivity through a NIC 1112, such as a gigabit Ethernet adapter. The NIC 1112 is capable of connecting the computer 1100 to other computing devices over the network 1008 (or 114). It should be appreciated that multiple NICs 1112 can be present in the computer 1100, connecting the computer to other types of networks and remote computer systems.

The computer 1100 can be connected to a mass storage device 1118 that provides non-volatile storage for the computer. The mass storage device 1118 can store an operating system 1120, programs 1122, and data, which have been described in greater detail herein. The mass storage device 1118 can be connected to the computer 1100 through a storage controller 1114 connected to the chipset 1106. The mass storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1100 can store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service-provider network 102, and or any components included therein, may be performed by one or more computer devices 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1118 can store other system or application programs and data utilized by the computer 1100.

In one embodiment, the mass storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1-10. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

As illustrated, the storage device 1118 may store a file folder 122 that includes event IDs 108 and associated event data 130 according to the techniques described herein. in some instances, the computer 1100 may receive, over the networks 114 and/or the LAN 1008, an event ID 108 from a requesting device 124 for which the requesting device 124 would like to have event data 130. The programs 1122 may include a search component that performs a binary search, or other search, to identify the event IDs 108 for the requested event ID 108, and supply or provide the corresponding event data 130 to the requesting device 124.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed by the one or more processors, cause the one or more processors to:
identify first events representing operations performed to manage one or more services provided by a cloud-based service provider;
generate first event identifiers that represent the first events according to a predefined nomenclature including a first prefix portion and a second prefix portion;
determine that the first event identifiers that represent the first events are associated with a same user account;
write first file folders to a storage location associated with a cloud-based storage service provided by the cloud-based service provider;
assign first file names to the first file folders such that each of the first file folders is assigned a respective first file name that is defined according to the first prefix portion;
write the first event identifiers to the first file folders such that each of the first event identifiers is written to a respective first file folder having a respective file name that corresponds to the first prefix portion of the respective first event identifier;
determine that a file folder of the first file folders includes a number of event identifiers that is greater than or equal to a threshold number of event identifiers;
based at least in part on the file folder including the number of the event identifiers that is greater than or equal to the threshold number of event identifiers, write second file folders to the storage location;
assign second file names to the second file folders such that each of the second file folders is assigned a respective second file name that includes the first file name of the file folder that is defined according to the first prefix portion and a respective second file name that is defined according to the second prefix portion;
write the event identifiers included in the file folder to the second file folders such that each of the event identifiers is written to a respective second file folder having a respective file name that corresponds to the second prefix portion of the respective event identifier; and
remove the event identifiers from being included in the file folder.

2. The system of claim 1, wherein the threshold number of event identifiers comprises a first threshold number of event identifiers, comprising further instructions that, when executed by the one or more processors, cause the one or more processors to:
determine that a number of sub-files included in the file folder is greater than or equal to a threshold number of sub-files;
determine that each of the sub-files includes a respective number of event identifiers that is less than a second threshold number of event identifiers; and
merge the sub-files to generate a merged file that includes the event identifiers of each of the sub-files.

3. The system of claim 1, wherein the threshold number of event identifiers comprises a first threshold number of event identifiers, comprising further instructions that, when executed by the one or more processors, cause the one or more processors to:

determine that a number of sub-file folders included in the file folder is greater than or equal to a threshold number of sub-file folders; and determine that each of the sub-file folders includes a respective number of event identifiers that is greater than or equal to a second threshold number of event identifiers, wherein determining that the file folder includes the number of event identifiers that is greater than or equal to the first threshold number of event identifiers is based at least in part on the number of sub-file folders being greater than or equal to the threshold number of sub-file folders and each of the sub-file folders including the respective number of event identifiers that is greater than or equal to the second threshold number of event identifiers.

4. The system of claim 1, comprising further instructions that, when executed by the one or more processors, cause the one or more processors to:

sort the event identifiers included in the file folder based at least in part on the respective first file names of the event identifiers to generate a sorted list of the event identifiers, wherein writing the event identifiers to the second file folders is performed according to the sorted list of the event identifiers.

5. A computer-implemented method comprising:

identifying a first event identifier that represents a first event of managing a service provided by a cloud-based service provider;

storing the first event identifier in a first file folder of a first group of file folders based at least in part on a first portion of the first event identifier corresponding to a first identifier associated with the first file folder;

determining that a group of event identifiers stored in the first file folder is greater than or equal to a threshold number;

based at least in part on the group of event identifiers being greater than or equal to the threshold number, writing a second group of file folders to storage; and storing the group of event identifiers in the second group of file folders such that the first event identifier is stored in a second file folder of the second group of file folders based at least in part on the first portion and a second portion of the first event identifier corresponding to a second identifier associated with the second file folder.

6. The computer-implemented method of claim 5, further comprising;

removing the group of event identifiers from being stored in first file folder;

identifying a second event identifier that represents a second event associated; and storing the second event identifier in the first file folder based at least in part on a first portion of the second event identifier corresponding to the first identifier associated with the first file folder.

7. The computer-implemented method of claim 6, wherein the first event and the second event are associated with a same user account of the cloud-based service provider.

8. The computer-implemented method of claim 5, further comprising:

storing event metadata representing the first event at a storage location indicated by the first event identifier;

receiving, via a user account associated with the service, a request for the metadata corresponding to the first event, wherein the request for the metadata includes an indication of the first event identifier;

downloading the first file folder and the second file folder based at least in part on the first identifier corresponding to the first portion of the first event identifier and the second identifier corresponding to the first portion and the second portion of the first event identifier;

searching the first file folder and the second file folder to identify the first event identifier as being stored in the second file folder;

determining the storage location of the event metadata based at least in part on the first event identifier indicating the storage location; and providing the event metadata for access by the user account.

9. The computer-implemented method of claim 8, wherein the first event identifier comprises a key in a key-value pair where the value comprises at least one of the metadata or a pointer to the storage location of the metadata.

10. The computer-implemented method of claim 5, further comprising:

sorting the group of event identifiers in the first group of file folders to generate a sorted list of event identifiers, wherein the group of event identifiers are stored in the second group of file folders at least partly in an order corresponding to the sorted list of event identifiers.

11. The computer-implemented method of claim 5, wherein the threshold number comprises a first threshold number, further comprising:

determining that a number of sub-file folders included in the first file folder is greater than or equal to a threshold number of sub-file folders; and determining that each of the sub-file folders includes a respective number of the group of event identifiers that is greater than or equal to a second threshold number, wherein determining that the group of event identifiers stored in the first file folder is greater than or equal to the threshold number is based at least in part on the number of sub-file folders being greater than or equal to the threshold number of sub-file folders and each of the sub-file folders including the respective number of the group of event identifiers that is greater than or equal to the second threshold number.

12. The computer-implemented method of claim 5, wherein the threshold number comprises a first threshold number, further comprising:

determining that a number of sub-file folders included in the first file folder is greater than or equal to a threshold number of sub-file folders;

determining that each of the sub-file folders includes a respective number of the group of event identifiers that is less than a second threshold number; and merging the sub-file folders to generate a merged file folder that includes the event identifiers of each of the sub-file folders.

13. The computer-implemented method of claim 5, wherein the group of event identifiers comprises a first group of event identifiers, further comprising:

identifying a second event identifier that represents a second event of managing the service;

storing the second event identifier in a second file folder of the first group of file folders based at least in part on a first portion of the second event identifier corresponding to a second identifier associated with the second file folder;

determining that a second group of event identifiers stored in the second file folder is greater than or equal to the threshold number;

based at least in part on the second group of event identifiers being greater than or equal to the threshold number, writing a third group of file folders to the storage; and storing the second group of event identifiers in the third group of file folders such that the second event identifier is stored in a third file folder of the third group of file folders based at least in part on the first portion and a second portion of the second event identifier corresponding to a third identifier associated with the third file folder.

14. The computer-implemented method of claim 5, wherein the threshold number comprises a first threshold number, further comprising:

analyzing a buffer to determine that a buffered group of event identifiers is greater than or equal to a second threshold number, wherein the buffered group of event identifiers includes the first event identifier;

sorting the buffered group of event identifiers according to respective first portions of the event identifiers in the buffered group of event identifiers to generate a sorted list; and storing, in the first group of file folders, individual event identifiers in the buffered group of event identifiers according to the sorted list.

15. A system comprising:

one or more processors; and one or more computer-readable media storing computer-executable instructions that, when executed by the one or more processors, cause the one or more processors to:

identify a first event identifier that represents a first event of interacting with a first service provided by a cloud-based service provider;

identify a second event identifier that represents a second event of interacting with at least one of the first service or a second service, wherein the first service and the second service are provided to a user account by the cloud-based service provider;

store the first event identifier in a first file folder of a first group of file folders based at least in part on a first portion of the first event identifier corresponding to a first identifier associated with the first file folder;

store the second event identifier in a second file folder of the first group of file folders based at least in part on a first portion of the second event identifier corresponding to a second identifier associated with the second file folder;

determine that a group of event identifiers stored in the first file folder is greater than or equal to a threshold number;

based at least in part on the group of event identifiers being greater than or equal to the threshold number, generate a second group of file folders for storage; and store the group of event identifiers in the second group of file folders such that the first event identifier is stored in a third file folder of the second group of file folders based at least in part on the first portion and a second portion of the first event identifier corresponding to a third identifier associated with the third file folder.

16. The system of claim 15, wherein the group of event identifiers comprises a first group of event identifiers, comprising further instructions that, when executed by the one or more processors, cause the one or more processors to:

determine that a second group of event identifiers stored in the second file folder is greater than or equal to the threshold number;

based at least in part on the second group of event identifiers being greater than or equal to the threshold number, generate a third group of file folders for storage; and store the second group of event identifiers in the third group of file folders such that the second event identifier is stored in a fourth file folder of the third group of file folders based at least in part on the first portion and a second portion of the second event identifier corresponding to a fourth identifier associated with the fourth file folder.

17. The system of claim 16, wherein the first group of file folders, the second group of file folders, the third group of file folders, and the fourth group of file folders each comprise a same number of file folders.

18. The system of claim 15, wherein the threshold number comprises a first threshold number, comprising further instructions that, when executed by the one or more processors, cause the one or more processors to:

analyze a buffer to determine that a buffered group of event identifiers is greater than or equal to a second threshold number, wherein the buffered group of event identifiers includes the first event identifier and the second event identifier;

sorting the buffered group of event identifiers according to respective portions of the event identifiers in the buffered group of event identifiers to generate a sorted list; and storing individual event identifiers in the buffered group of event identifiers according to the sorted list.

19. The system of claim 15, comprising further instructions that, when executed by the one or more processors, cause the one or more processors to:

store event metadata representing the first event at a storage location indicated by the first event identifier;

receive, via a user account associated with the service, a request for the metadata corresponding to the first event, wherein the request for metadata includes an indication of the first event identifier;

read the first file folder and the third file folder based at least in part on the first portion and the second portion of the first event identifier;

search the first file folder and the third file folder based at least in part on the first portion and the second portion of the first event identifier to identify the first event identifier as being stored in the third file folder;

determine the storage location of the event metadata based at least in part on the first event identifier indicating the storage location; and providing the event metadata for access by the user account.

20. The system of claim 15, comprising further instructions that, when executed by the one or more processors, cause the one or more processors to:

remove the group of event identifiers from being stored in the first file folder; and store a subsequent event identifier in the first file folder.

* * * * *